(12) United States Patent
Sundaravaradan et al.

(10) Patent No.: US 9,858,187 B2
(45) Date of Patent: Jan. 2, 2018

(54) BUFFERING REQUEST DATA FOR IN-MEMORY CACHE

(71) Applicant: salesforce.com, inc., San Francisco, CA (US)

(72) Inventors: Barathkumar Sundaravaradan, San Francisco, CA (US); Christopher James Wall, Austin, TX (US); Lawrence Thomas Lopez, Cupertino, CA (US); Paul Sydell, San Rafael, CA (US); Sreeram Duvur, Fremont, CA (US); Vijayanth Devadhar, Fremont, CA (US)

(73) Assignee: salesforce.com, inc., San Francisco, CA (US)

( * ) Notice: Subject to any disclaimer, the term of this patent is extended or adjusted under 35 U.S.C. 154(b) by 238 days.

(21) Appl. No.: 14/922,686

(22) Filed: Oct. 26, 2015

(65) Prior Publication Data

US 2017/0116124 A1    Apr. 27, 2017

(51) Int. Cl.
| | |
|---|---|
| *G06F 12/08* | (2016.01) |
| *G06F 12/0815* | (2016.01) |
| *G06F 13/16* | (2006.01) |
| *G06F 12/0888* | (2016.01) |
| *G06F 12/0811* | (2016.01) |

(52) U.S. Cl.
CPC ...... *G06F 12/0815* (2013.01); *G06F 12/0811* (2013.01); *G06F 12/0888* (2013.01); *G06F 13/1642* (2013.01); *G06F 13/1673* (2013.01); *G06F 2212/621* (2013.01)

(58) Field of Classification Search
CPC ............. G06F 12/0815; G06F 12/0888; G06F 12/0811; G06F 12/0813; G06F 12/0866; G06F 12/0897; G06F 13/1673; G06F 13/1642; G06F 2212/621
See application file for complete search history.

(56) References Cited

U.S. PATENT DOCUMENTS

| | | | |
|---|---|---|---|
| 5,915,104 A * | 6/1999 | Miller | G06F 13/4022 710/310 |
| 7,711,705 B1 * | 5/2010 | Patsenker | H04L 67/1097 707/613 |

(Continued)

OTHER PUBLICATIONS

Introduction to Redis—Redis, http://redis.io/topics/introduction, 1 page. [Retrieved Oct. 21, 2015].

(Continued)

*Primary Examiner* — Hiep Nguyen
(74) *Attorney, Agent, or Firm* — Meyertons, Hood, Kivlin, Kowert & Goetzel, P.C.

(57) ABSTRACT

Techniques are disclosed relating to an in-memory cache for web application data. In some embodiments, received transactions include multiple operations, including one or more cache operations to access the in-memory cache. In some embodiments, transactions are performed atomically. In some embodiments, data for the one or more cache operations is stored locally in memory by an application server outside of the in-memory cache until the transaction is successfully completed. This may improve performance and facilitate atomicity, in some embodiments.

20 Claims, 12 Drawing Sheets

---

Receive a request to perform a transaction that includes a plurality of operations, including one or more cache operations to access an in-memory cache.
*1210*

↓

Store data corresponding to the one or more cache operations in memory outside of the in-memory cache until the transaction is successfully completed
*1220*

↓

Cache data corresponding to the one or more cache operations in the in-memory cache after successful completion of the transaction
*1220*

(56) References Cited

U.S. PATENT DOCUMENTS

| | | | |
|---|---|---|---|
| 2005/0044311 A1* | 2/2005 | Lahiri | G06F 12/0804 |
| | | | 711/113 |
| 2005/0251623 A1* | 11/2005 | Arimilli | G06F 12/0897 |
| | | | 711/118 |
| 2007/0011330 A1* | 1/2007 | Dinker | G06F 11/3409 |
| | | | 709/226 |
| 2009/0037495 A1* | 2/2009 | Kumar | G06F 17/3048 |
| 2009/0198867 A1* | 8/2009 | Guthrie | G06F 12/0815 |
| | | | 711/100 |
| 2012/0047332 A1* | 2/2012 | Bannon | G06F 12/0891 |
| | | | 711/135 |
| 2014/0143471 A1* | 5/2014 | Moyer | G06F 13/4059 |
| | | | 710/310 |
| 2015/0106560 A1* | 4/2015 | Perego | G06F 12/10 |
| | | | 711/105 |
| 2016/0092318 A1* | 3/2016 | Ananthapadmanabh | |
| | | | G06F 11/0784 |
| | | | 714/15 |
| 2017/0052723 A1* | 2/2017 | Voigt | G06F 13/28 |

OTHER PUBLICATIONS

Memcached—a distributed memory object caching system, http://memcached.org/about, 2 pages. [Retrieved Oct, 21, 2015].

* cited by examiner

Partition Total Memory Usage Table 650

| Key | Value (bytes) |
|---|---|
| <prefix>:my_namespace:my_partition.o | 102 |
| <prefix>:local:default:o | 200 |
| <prefix>:my_namespace:admin.o | 2000 |

Partition Memory Evaluation Queue 660

| Key (namespace) | Score (time) |
|---|---|
| <prefix>:my_namespace:my_partition.o | 123456 |
| <prefix>:my_namespace:my_application:s | 123499 |

<prefix>:my_namespace:my_partition.o 670

| Key (developer/customer) |
|---|
| key1 |
| key2 |

<prefix>:my_namespace:my_partition.o:TTL 680

| Key (developer/customer) | Value (bytes) |
|---|---|
| key1 | 123456 |
| key2 | 125556 |

<prefix>:my_namespace:my_partition.o:key1 610

| Key | Value |
|---|---|
| value | <byte-array> |
| builder | <byte-array>* |
| lastaccess | datetime |
| stats | <byte-array> |
| evict | false |
| visibility | my_namespace |

<prefix>:my_namespace:my_partition.o:LRU 620

| Member | Score (time) |
|---|---|
| key1 | 123456 |
| key2 | Integer.MAX_VALUE |

<prefix>:my_namespace:my_partition.o:key1:keys 630

| Key |
|---|
| <prefix>:my_namespace:my_partition.o:key1 |
| <prefix>:my_namespace:my_partition.o:LRU||key1 |
| <prefix>:my_namespace:my_partition.o:TTL||key1 |
| <prefix>:my_namespace:my_partition.o:memory||key1 |
| <prefix>:my_namespace:my_partition.o:||key1 |

<prefix>:my_namespace:my_partition.o:memory 640

| Key | Value (bytes) |
|---|---|
| key1 | 20 |
| key2 | 4 |

<prefix>:my_namespace:my_partition:s:sid1 (hash) 710

| Key | Value |
|---|---|
| KeyA | <byte-array> |
| KeyB | <byte-array> |
| stats | <byte-array> |
| visibility | my_namespace |

<prefix>:my_namespace:my_partition:o:LRU (sorted set) 720

| Member | Score (time) |
|---|---|
| KeyA | 123456 |
| KeyB | Integer.MAX_VALUE |

<prefix>:my_namespace:my_partition:s:sid1:keys (list) 730

| Key |
|---|
| ...:my_namespace:my_partition:s:sid1 |
| ...my_namespace:my_partition:s:sid1:LRU |
| ...my_namespace:my_partition:s:TTL‖sid1 |

<prefix>:my_namespace:my_partition:o:memory (hash) 740

| Key | Value (bytes) |
|---|---|
| KeyA | 20 |
| KeyB | 4 | sid1 (list) 770

| Key (full key) |
|---|
| <prefix>:my_namespace:my_partition:s |
| <prefix>:my_namespace:default_partition:s |

<prefix>:my_namespace:my_partition:s (list) 780

| Key (developer/customer) |
|---|
| sid1 |
| sid2 |

<prefix>:my_namespace:my_partition:s:TTL (sorted list) 790

| Key (developer/customer) | Value (bytes) |
|---|---|
| Sid1:KeyA | 123456 |
| Sid2:KeyX | 125556 |

```
void put(
    String key,
    Object value,
    Cache.Builder instance
    Long ttl
    Cache.Visibility visibility
    Boolean immutable
);

Object get(
    String key,
);

List<Object> get(
    Set<String> keys
);
```

*FIG. 8*

```
void put(
    String key,
    Object value
    Boolean immutable,
    Boolean global
    Long ttl
);

Object get(
    String key,
    Boolean immediate
);

Object remove(
    String key,
    Boolean immediate
);
```

*FIG. 9*

BUFFERING REQUEST DATA FOR IN-MEMORY CACHE

BACKGROUND

Cloud application development platforms, such as the Force.com multitenant architecture, may allow individual enterprises and software as a service (SaaS) vendors to develop robust, reliable, and Internet-scale applications. Web applications may generate various types of data, e.g., by accessing a database and processing accessed information. Some data may be computationally expensive to generate and some data may change infrequently. Further, some data may be used by multiple users across an application or organization.

BRIEF DESCRIPTION OF THE DRAWINGS

FIGS. 6 and 7 are diagrams illustrating exemplary metadata for an organization cache and session cache respectively, according to some embodiments.

FIGS. 8 and 9 are diagrams illustrating exemplary caching functions, according to some embodiments.

DETAILED DESCRIPTION

Figure 1:
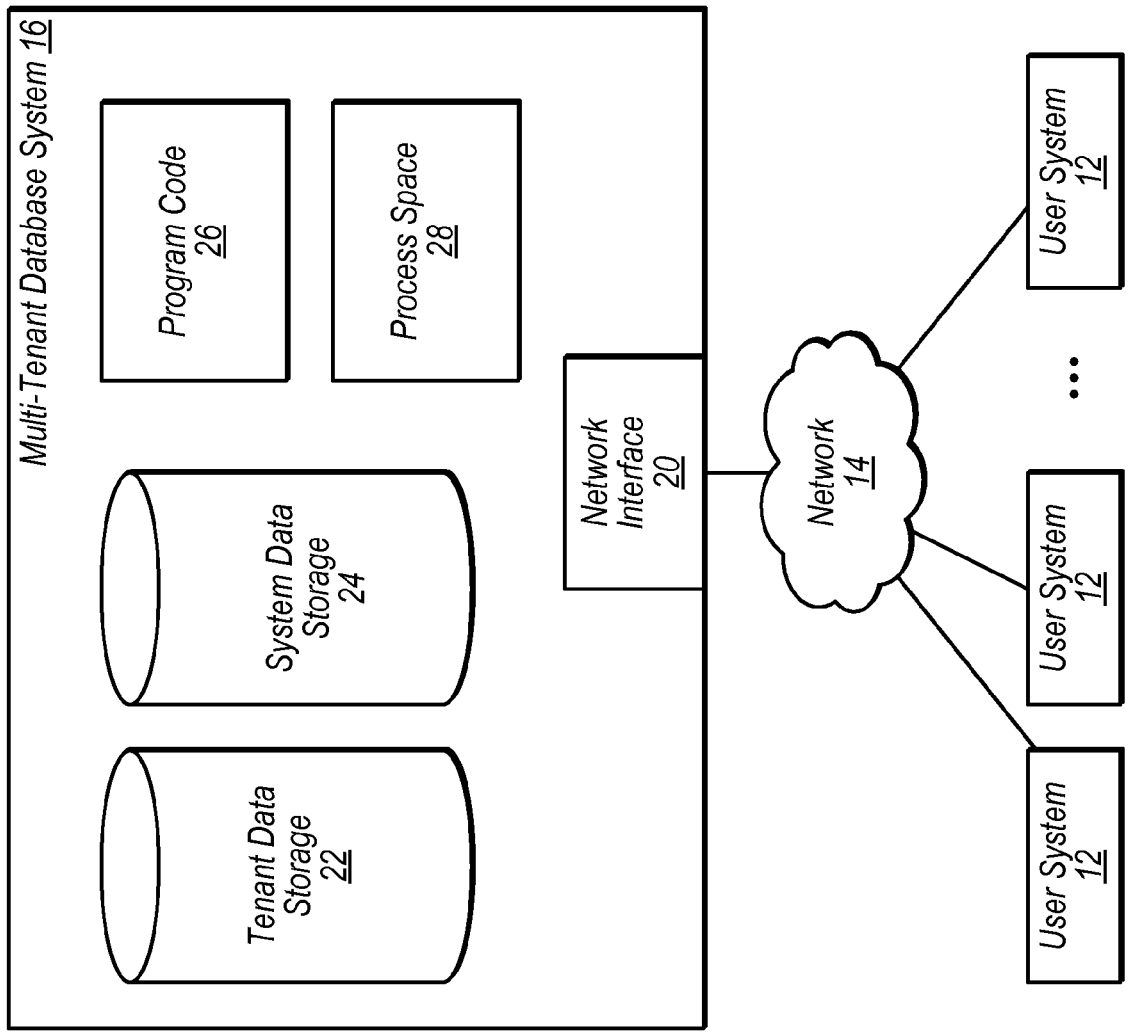
FIG. 1 is a block diagram illustrating an exemplary environment for a multi-tenant database system, according to some embodiments.
Figure 2:
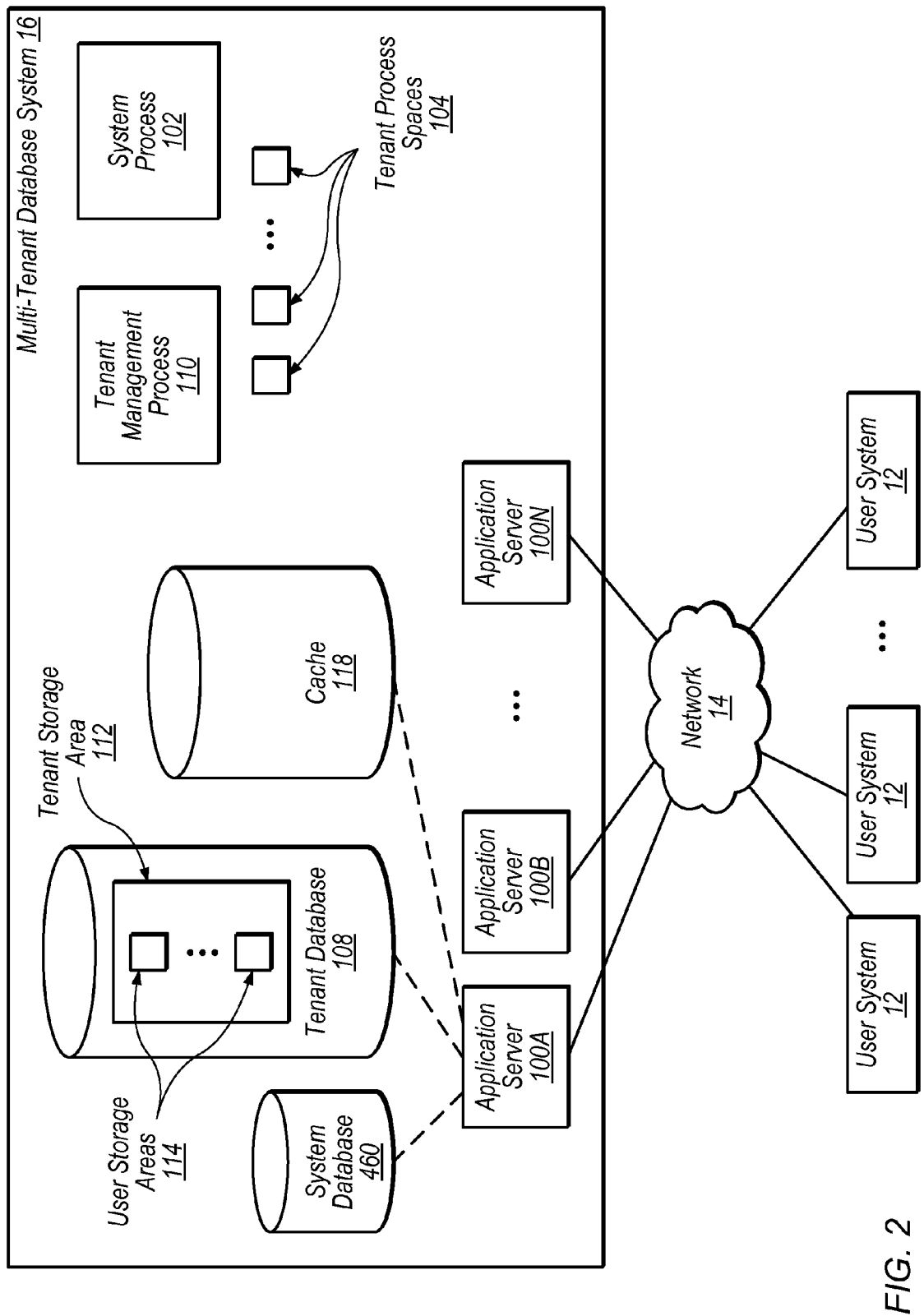
FIG. 2 is a block diagram illustrating an exemplary multi-tenant database system in more detail, according to some embodiments.

This disclosure initially describes, with reference to FIGS. 1-2, embodiments of an exemplary multi-tenant database system that includes an in-memory, multi-tenant cache. (In other embodiments, similar caching techniques may be used in non-multi-tenant environments.) It then describes, with reference to FIGS. 3-4, an exemplary cache API structure and techniques for storing and retrieving data from the cache. In some embodiments, separate caches are maintained for user sessions (which may be referred to as a "session cache") and for a broader group (which may be referred to as an "organization cache"). FIGS. 5-7 illustrate exemplary cache partitioning and metadata for cache organization. FIGS. 8-9 illustrate exemplary API functions and FIGS. 10-13 illustrate exemplary methods for operating a cache. In various embodiments, disclosed techniques may improve performance of web applications while maintaining proper visibility scope for cached data.

Exemplary Multi-Tenant Database System

FIG. 1 illustrates an exemplary environment in which a multi-tenant database and cache system might be implemented. Note that the disclosed multi-tenant systems are included to illustrative purposes but are not intended to limit the scope of the present disclosure. In other embodiments, similar techniques may be implemented in non-multi-tenant environments such as various client/server environments, cloud computing environments, clustered computers, etc. As illustrated in FIG. 1 (and in more detail in FIG. 2) one or more user systems 12 may interact via a network 14 with a multi-tenant database system (MTS) 16. The users of those user systems 12 may be users in differing capacities and the capacity of a particular user system 12 might be determined by the current user. For example, when a salesperson is using a particular user system 12 to interact with MTS 16, that user system 12 may have the capacities allotted to that salesperson. However, while an administrator is using the same user system 12 to interact with MTS 16, it has the capacities allotted to that administrator.

Network 14 may be a LAN (local area network), WAN (wide area network), wireless network, point-to-point network, star network, token ring network, hub network, or any other appropriate configuration. The global internetwork of networks often referred to as the "Internet" with a capital "I," will be used in many of the examples herein and is one example of a TCP/IP (Transfer Control Protocol and Internet Protocol) network. It should be understood, however, that the networks that the present invention may utilize any of various other types of networks.

User systems 12 may communicate with MTS 16 using TCP/IP and, at a higher network level, use other common Internet protocols to communicate, such as HTTP, FTP, AFS, WAP, etc. As an example, where HTTP is used, user system 12 might include an HTTP client commonly referred to as a "browser" for sending and receiving HTTP messages from an HTTP server at MTS 16. Such a server might be implemented as the sole network interface between MTS 16 and network 14, but other techniques might be used as well or instead. In some implementations, the interface between MTS 16 and network 14 includes load sharing functionality, such as round-robin HTTP request distributors to balance loads and distribute incoming HTTP requests evenly over a plurality of servers. Preferably, each of the plurality of servers has access to the MTS's data, at least for the users that are accessing a server.

In some embodiments, the system shown in FIG. 1 implements a web-based customer relationship management (CRM) system. For example, in some embodiments, MTS 16 includes application servers configured to implement and execute CRM software applications as well as provide related data, code, forms, web pages and other information to and from user systems 12 and to store to, and retrieve from, a database system related data, objects and web page content. In embodiments of a multi-tenant system, tenant data is preferably arranged so that data of one tenant is kept separate from that of other tenants so that that one tenant does not have access to another tenant's data, unless such data is expressly shared.

One arrangement for elements of MTS 16 is shown in FIG. 1, including a network interface 20, storage 22 for tenant data, storage 24 for system data accessible to MTS 16 and possibly multiple tenants, program code 26 for implementing various functions of MTS 16, and a process space 28 for executing MTS system processes and tenant-specific processes, such as running applications as part of an application service.

Several elements in the system shown in FIG. 1 may include conventional, well-known elements that need not be explained in detail here. For example, each user system 12 may be a desktop personal computer, workstation, laptop, PDA, cell phone, or any WAP-enabled device or any other computing device capable of interfacing directly or indirectly to the Internet or other network connection. User system 12 may execute an HTTP client, e.g., a browsing program, such as Microsoft's Internet Explorer™ browser, Netscape's Navigator™ browser, Opera's browser, or a WAP-enabled browser in the case of a cell phone, PDA or other wireless device, or the like, allowing a user (e.g., subscriber of a CRM system) of user system 12 to access, process, and view information and pages available to it from MTS 16 over network 14. Each user system 12 may include one or more user interface devices, such as a keyboard, a mouse, touch screen, pen or the like, for interacting with a graphical user interface (GUI) provided by the browser on a display monitor screen, LCD display, etc. in conjunction with pages, forms and other information provided by MTS 16 or other systems or servers. As discussed above, the present invention is suitable for use with the Internet, which refers to a specific global internetwork of networks. It should be understood, however, that other networks may be used instead of the Internet, such as an intranet, an extranet, a virtual private network (VPN), a non-TCP/IP based network, any LAN or WAN or the like.

In some embodiments, each user system 12 and its components are operator configurable using applications, such as a browser, that include computer code executable on one or more processing elements. Similarly, in some embodiments, MTS 16 (and additional instances of MTSs, where more than one is present) and their components are operator configurable using application(s) that include computer code executable on one or more processing elements. Thus, various operations described herein may be performed by executing program instructions stored on a non-transitory computer-readable medium and executed by one or more processing elements. The program instructions may be stored on a non-volatile medium such as a hard disk, or may be stored in any other volatile or non-volatile memory medium or device as is well known, such as a ROM or RAM, or provided on any media capable of staring program code, such as a compact disk (CD) medium, digital versatile disk (DVD) medium, a floppy disk, and the like. Additionally, the entire program code, or portions thereof, may be transmitted and downloaded from a software source, e.g., over the Internet, or from another server, as is well known, or transmitted over any other conventional network connection as is well known (e.g., extranet, VPN, LAN, etc.) using any communication medium and protocols (e.g., TCP/IP, HTTP, HTTPS, Ethernet, etc.) as are well known. It will also be appreciated that computer code for implementing aspects of the present invention can be implemented in any programming language that can be executed on a server or server system such as, for example, in C, C+, HTML, Java, JavaScript, or any other scripting language, such as VBScript.

According to one embodiment, each MTS 16 is configured to provide web pages, forms, applications, data, and/or media content to user systems 12 to support the access by user systems 12 as tenants of MTS 16. As such, in this embodiment, MTS 16 provides security mechanisms to keep each tenant's data separate unless the data is shared. If more than one MTS is used, they may be located in close proximity to one another (e.g., in a server farm located in a single building or campus), or they may be distributed at locations remote from one another (e.g., one or more servers located in city A and one or more servers located in city B). As used herein, MTSs may include one or more logically and/or physically connected servers distributed locally or across one or more geographic locations. Additionally, the term "server" includes a computer system, including processing hardware and process space(s), and an associated storage system and database application as is well known in the art. It should also be understood that "server system" and "server" are often used interchangeably herein. Similarly, the databases described herein can be implemented as single databases, a distributed database, a collection of distributed databases, a database with redundant online or offline back-ups or other redundancies, etc., and might include a distributed database or storage network and associated processing intelligence.

FIG. 2 illustrates exemplary embodiments of an MTS 16 and various interconnections in more detail. In this example, the network interface is implemented as one or more HTTP application servers 100. Also shown is system process space 102 including individual tenant process spaces 104, a system database 106, tenant database(s) 108 and a tenant management process space 110. Tenant database 108 may be sharded across application servers and may be divided into individual tenant storage areas 112, which can be either a physical arrangement or a logical arrangement. Within each tenant storage area 112, user storage 114 might be allocated for each user.

In the illustrated embodiment, each application server 100 also includes at least a portion of a cache 118. In some embodiments, user systems 12 that utilize web applications can request that data be stored in cache 118 (e.g., using a "put" operation) and later retrieve the data (e.g., using a "get" operation) rather than re-generating the data. In some embodiments, capacity limits may be assigned to different users/tenants/partitions, etc. and cached data may be evicted in order to remain below the allotted capacity. In some embodiments, cached data for a particular tenant is kept private from other tenants. Further, the visibility scope for cached data within a particular tenant may be configurable.

In some embodiments, cache 118 is split across multiple application servers 100. In some embodiments, splitting across multiple instances may allow the data in cache 118 to fit in system memory space, which may improve response times relative to storing data for cache 118 in disk storage, for example. As used herein, an "in-memory cache" is a cache that stores data in system memory space (which typically means that the data can be stored in RAM) rather than requiring paging for storage (as is typically required for traditional disc storage, for example). Cache 118 may also be a "multi-tenant" cache in the sense that a single cache is used to provide separate virtual caches for multiple different tenant entities. The different tenants may use the same data structure to store data or different tenants may have different data structures in the cache. In various embodiments, multi-tenant caches enforce data security between tenants such that data from one tenant is not available to other tenants. Thus, as used herein, the term "tenant" in the context of a multi-tenant cache refers to an entity for which cache entries are separately maintained such that different tenants cannot access each other's data. In some embodiments, tenants may authorize other tenants to access their data via the cache, while in other embodiments a given tenant's data may be accessible to only that tenant via the multi-tenant cache (although that tenant may subsequently share data retrieved from the cache, as that tenant desires).

It should also be understood that each application server 100 may be communicably coupled to database systems, e.g., system database 106 and tenant database(s) 108, via, a different network connection. For example, one server 100₁ might be coupled via the Internet 14, another server 100_{N-1} might be coupled via a direct network link, and another server 100_N might be coupled by yet a different network connection. Transfer Control Protocol and Internet Protocol (TCP/IP) are preferred protocols for communicating between servers 100 and the database system, however, it will be apparent to one skilled in the art that other transport protocols may be used to optimize the system depending on the network interconnect used.

In preferred aspects, each application server 100 is configured to handle requests for any user/organization. Because it is desirable to be able to add and remove application servers from the server pool at any time for any reason, there is preferably no server affinity for a user and/or organization to a specific application server 100. In one embodiment, therefore, an interface system (not shown) implementing a load balancing function (e.g., an F5 Big-IP load balancer) is communicably coupled between the servers 100 and the user systems 12 to distribute requests to the servers 100. In one aspect, the load balancer uses a least connections algorithm to route user requests to the servers 100. Other examples of load balancing algorithms, such as are round robin and observed response time, also can be used. For example, in certain aspects, three consecutive requests from the same user could hit three different servers, and three requests from different users could hit the same server. In this manner, MTS 16 is multi-tenant, wherein the MTS 16 handles storage of different objects and data across disparate users and organizations.

As an example of storage, one tenant might be a company that employs a sales force where each salesperson uses MTS 16 to manage their sales process. Thus, a user might maintain contact data, leads data customer follow-up data, performance data, goals and progress data, all applicable to that user's personal sales process (e.g., in tenant database 108). In some MTS embodiments, since all of this data and the applications to access, view, modify, report, transmit, calculate, eta, can be maintained and accessed by a user system having nothing more than network access, the user can manage his or her sales efforts and cycles from any of many different user systems. For example, if a salesperson is paying a visit to a customer and the customer has Internet access in their lobby, the salesperson can obtain critical updates as to that customer while waiting for the customer to arrive in the lobby.

While each user's sales data may be separate from other users' sales data regardless of the employers of each user, some data may be organization-wide data shared or accessible by a plurality or all of the sales three for a given organization that is a tenant. Thus, there may be some data structures managed by MTS 16 that are allocated at the tenant level while other data structures are managed at the user level. Because an MTS may support multiple tenants including possible competitors, the MTS should have security protocols that keep data, applications and application use separate. Also, because many tenants will opt for access to an MTS rather than maintain their own system, security, redundancy, up-time and backup are more critical functions and need to be implemented in the MTS.

In addition to user-specific data and tenant-specific data, MTS 16 might also maintain system level data usable by multiple tenants. Such system level data might include industry reports, news, postings, and the like that are sharable among tenants.

In certain aspects, client systems 12 communicate with application servers 100 to request and update system-level and tenant-level data from MTS 16 that may require one or more queries to database system 106 and/or database system 108. In some embodiments, MTS 16 automatically generates one or more SQL statements (the SQL query) designed to access the desired information.

Each database may generally be viewed as a set of logical tables containing data fitted into predefined categories. Each table typically contains one or more data categories logically arranged in physical columns. Each row of a table typically contains an instance of data for each category defined by the columns. For example, a CRM database may include a table that describes a customer with columns for basic contact information such as name, address, phone number, fax number, etc. Another table may describe a purchase order, including columns for information such as customer, product, sale price, date, etc.

Exemplary Cache Stack

Figure 3:
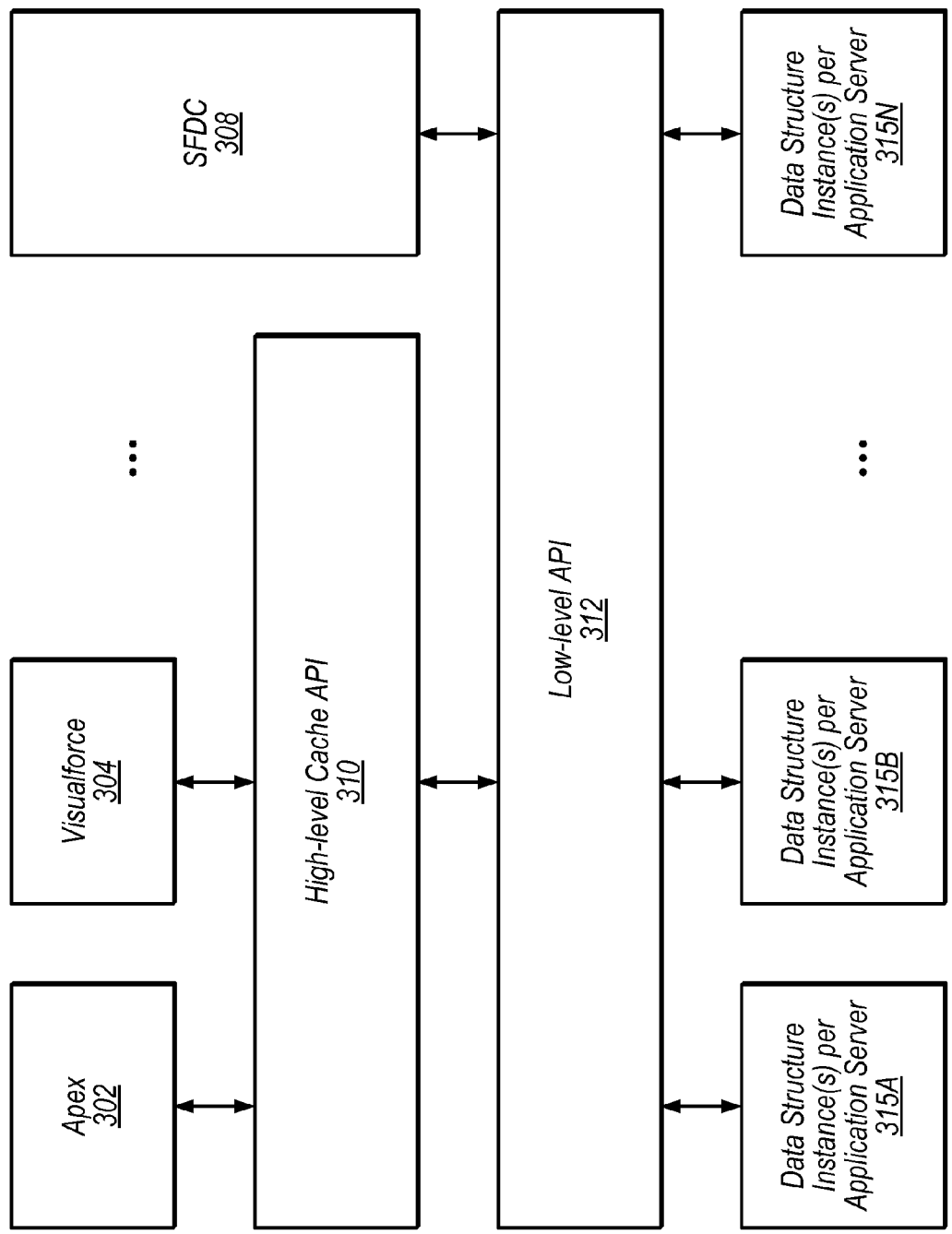
FIG. 3 is a block diagram illustrating and exemplary API stack, according to some embodiments.

FIG. 3 is a block diagram illustrating an exemplary stack for accessing cache 118, according to some embodiments. In the illustrated embodiment, web applications may be developed using Apex 302 and VISUALFORCE® 304 application programming interfaces (APIs). Apex is a Salesforce.com (SFDC) programming language that is strongly typed, object-oriented, uses Java-like syntax to perform database stored procedures. Visualforce is a markup language that may provide user-friendly development, integration with other web-based interfaces, concise syntax, data-driven defaults, and a hosted platform. In other embodiments, any of various appropriate APIs that are currently available or developed in the future may be implemented at this level (and/or other levels in the stack), such as C, Java, etc.

In some embodiments, a high-level programming API such as the illustrated SFDC API 308 may interact directly with a low-level API 312. It may be desirable to have a high-level cache interface between low-level API 312 and high-level programming APIs. Thus, as shown, Apex API 302 and Visualforce API 304 may interact with the cache via a high-level cache API 310. In some embodiments, this high-level cache API may provide simple, high-level functions for putting data in a cache, getting data from a cache, clearing data, etc. High-level cache API 310 may simplify caching operations relative to using low-level API 312. For example, high-level cache API 310 may allow a user to put data in cache 118 and retrieve data from cache 118 without worrying about the underlying data structure of cache 118, sharding of data in cache 118, etc.

Low-level API 312, in the illustrated embodiment, is used to handle the data structure for caching data and may provide more control over cached data than high-level cache API 310. One example of low-level API 312 is the Redis platform. Another example is memcached. In other embodiments, any of various low-level APIs may be implemented. Low-level API 312 may be used to handle sharding, generate cache statistics, enforce capacity restrictions, etc.

In the illustrated embodiment, the SFDC interface 308 includes both high-level programming API and high-level cache API functionality. In some embodiments, an API may provide functionality described with reference to multiple ones of the various levels illustrated in FIG. 3. Programming at a given level may provide tradeoffs in usability and low-level control, for example. In some embodiments, users are restricted to one or more upper levels in the illustrated hierarchy. In other embodiments, users are not restricted to one or more upper levels, but may have access to any and/or all levels in the hierarchy.

Data structure instance(s) 315A-315N, in the illustrated embodiment, are configured to actually store cached data. In various embodiments, these data structures are stored in-memory. For example, each application server 100 of FIG. 2 may be assigned a database instance (e.g., a NoSQL database instance such as a Redis instance), in some embodiments. In some embodiments, a Redis key is assigned to each namespace and sharding is applied across each namespace. In a multi-tenant system, namespaces within a tenant configuration are discussed in further detail below with reference to FIG. 5A. Sharding is a well-known database technique in which data is horizontally partitioned (e.g., rows of a database table are stored on different server instances) and "shards" of the data are held on different database server instances. This is contrast to normalization or vertical partitioning, in which database tables are split into columns. Some sharded data may be stored by only a single server instance while other data may be stored in all shards, for example. In some embodiments, data for a given tenant may be visible across namespaces, depending on initial configuration parameters or subsequent commands for the tenant. In other embodiments, sharding may not be applied; sharding is implemented in various embodiment disclosed herein for illustrative purposes but is not intended to limit the scope of the present disclosure.

Session Cache Overview

In some embodiments, system 16 is configured to provide multiple types of caches. A session cache, in some embodiments, is a cache that is scoped to a user session and thus typically does not last after the session is ended. A session refers to an interaction of the user with a web application and is typically associated with one or more data structures for storing data during the interaction. For example, a session may begin when a user invokes a web application via a web browser and may end when the user closes the web browser, logs out of the application, etc. In various embodiments, data in the session cache is visible only within the session and is not available from other sessions. The session cache may be used to cache data that is fairly static (i.e., does not change often) or that is expensive to compute or retrieve (e.g., certain database queries, results of compute-intensive processing, etc.). The session cache may eliminate redundant DB invocations and web service callouts and may reduce request/response payload size. This may include, for example, generating, caching, and re-using user-specific data or views such as a custom navigation menu, gathering form data across multiple requests or web pages, and/or storing information similarly to the Visualforce View State, which may include components, field values, and controller state for a form. This may reduce demand on backend services and improve response times for system 16.

In some embodiments, the session cache is configured to store data as key/value pairs. The data may include data gathered from the user, generated from database calls, callouts, or page rendering, for example. Each key may be a unique value within a given tenant. In some embodiments, the session cache may initially be retained beyond the end of a corresponding session, but may be evicted eventually to clear up cache space. In other embodiments, the session cache for a particular session may be invalidated as soon as the session ends. In some embodiments, data that should live beyond the life of a session or should be available to multiple sessions is managed by an application developer using another data structure, such as an organization cache (discussed in further detail below). The session cache is limited in size, in some embodiments, in order to maintain consistent response times across sessions, for example. In some embodiments, the session cache does not handle data structures or objects directly but is merely configured to store data without knowledge of its structure. In these embodiments, data is serialized (e.g., written as bytes according to a pre-determined serialization technique) before being stored and de-serialized when retrieved.

The session cache, in some embodiments, is not concurrent. For example, the session cache, in some embodiments, is not shared among multiple browsers open by the same user. Thus, if a given user creates simultaneous requests via different browser windows or tabs or uses asynchronous requests, subsequent requests may retrieve stale data from the cache or overwrite previously stored items. Therefore, in some embodiments, the session cache API provides direct operations that are performed immediately to facilitate concurrency. Direct operations are discussed in further detail with reference to FIG. 4 below.

Organization Cache Overview

An organization cache is another type of cache that system 16 is configured to provide, in some embodiments. This cache may store data that is available to multiple sessions (e.g., data cached by one session may be retrieved by a user in another session). The organization cache may, by default, be scoped to be available across all namespaces of the owning tenant. As used herein, the term "namespace" refers to a grouping of data for an application for which a visibility scope can be defined. A namespace may be defined for each application, for a portion of an application and/or for multiple applications. Applications, users, requests, etc. may be associated with a namespace and visibility parameters may be defined such that certain data within a namespace is only visible to entities associated with the namespace. For example, an application in one namespace may or may not be able to access data in another namespace, depending on visibility parameters of the other namespace. Similarly, a user session associated with a particular namespace may or may not be able to access data for other namespaces. Note, however, that a given user session may be associated with multiple different namespaces. Namespaces may be statically defined for an application or may be dynamically adjustable by administrators.

In some embodiments, data stored in an organization cache may have configurable visibility, e.g., for restriction to particular namespaces, users, or applications of a particular tenant, etc. Thus, some data stored in an organization cache may be visible to all users associated with a particular tenant. In various embodiments, however, a given tenant's organization cache is not available to other tenants, even though data for multiple tenants may be cached using a shared data structure. An organization cache may persist indefinitely so long as it is being used, but may be associated with a time-to-live (TTL) that indicates a desired duration of caching for the data and may eventually be cleared based on the TTL, capacity constraints, and/or inactivity, in some embodiments.

The organization cache, in some embodiments, is also a key/value pair cache that supports put/get/remove/etc. The organization cache, in some embodiments, may be partitioned, e.g., to provide flexible separate capacity limits for different partitions within the same organization cache.

The organization cache and session cache may utilize similar data structures and store similar types of data, in some embodiments and situations. Providing separate caches may, however, provide developers flexibility in caching data for different user sessions separately (e.g., in a session cache) or caching data that is likely to be useful to multiple sessions (e.g., in an organization cache).

Various functionality discussed herein with reference to an organization cache may also apply to session caches and vice versa. Further, various functionality discussed with reference to a cache in general may apply to an organization cache and/or a session cache.

Exemplary Caching Requests and Buffered Cache Interactions

In some embodiments, multiple cache requests may be included in a request or transaction which may be performed atomically (e.g., similar to other SFDC requests). Generally, a "transaction" is a request to perform an action such as invoking Visualforce or Apex, web requests, HTTP requests, REST requests, etc. A transaction from a user system 12 may be received by an application server 100 which may in turn send a response. In some embodiments, mutable cache commands (i.e., cache commands that change the cache state, such as put and remove operations, for example) for failed transactions are not performed. Thus, in some embodiments, transactions are performed atomically by default, such that all of the operations in the transaction are performed, or none of them are performed (e.g., by rolling back any intermediate results if a transactions fails). Transactions may fail for a variety of reasons, including customer code failures, internal exceptions, etc. Examples of requests or transactions that may be performed atomically include Apex transactions, for example, in the SFDC context.

Figure 4:
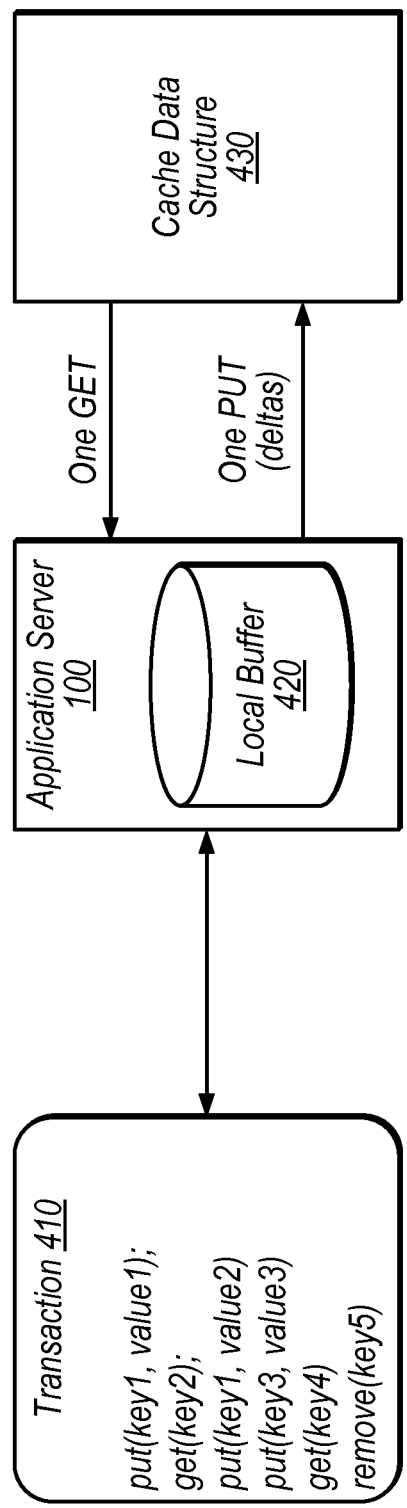
FIG. 4 is a block diagram illustrating exemplary atomic execution of an exemplary transaction by an application server, according to some embodiments.

FIG. 4 shows an example transaction 410 (which may also be referred to as a request) that includes three put operations, two get operations, and a remove operation. Transaction 410, in various embodiments, may also include non-cache-related operations or commands. In the illustrated embodiment, if transaction 410 is successful (e.g., if every operation in transaction 410 is successfully completed), then a single get operation and a single put operation is performed to cache data structure 430. In the illustrated embodiment, if transaction 410 fails, then no get or put operations are performed to cache data structure 430.

For example, if transaction 410 is successful, application server 100 may perform one put operation that stores key1/value2 (the overall delta caused by transaction 410, because value 1 is overwritten) and key3/value3. Similarly, application server 100 may perform one get operation to retrieve data corresponding to key2 and key4. Application server 100 may also perform a remove operation for key 5 once transaction 410 is successful as a whole.

In the illustrated embodiment, application server 100 may buffer cache operations using local buffer 420 until transaction 410 has succeeded or failed. For example, application server 100 may store key1/value1 in local buffer 420 until transaction 410 is completed. This may allow for atomic transactions and may also increase performance. For example, if a request accesses data to be cached (consider, e.g., a get(key1) operation that were to follow the first "put" operation within transaction 410 in program order), application server 100 is configured to provide the data directly from local buffer 420, in some embodiments, which may reduce access times. In some embodiments, data in local buffer 420 is not serialized, further decreasing access times. Access times may also be reduced because cache data structure 430 may be sharded across multiple application servers 100 such that application server 100 does not actually store the desired data, meaning that the data would be retrieved from another application server 100 if it were not available in local buffer 420.

Cache data structure 430, in the illustrated embodiment, may include cached data from multiple tenants (e.g., organization and/or session caches for multiple tenants) and may be sharded across multiple application servers 100. In some embodiments, a shared data structure is used for cache data for multiple tenants while in other embodiments separate data structures may be used for different tenants. Thus, cache data structure 430 may be shared in the sense that its structures include keys from multiple tenants. For example, a database table in cache data structure 430 may include a row for key1 from one tenant and another for a key from another tenant. In various embodiments, cache 118 is configured such that data cached by one tenant is not available to other tenants. In some embodiments, visibility parameters may allow configurable scope for sharing cached data within a given tenant organization.

In some embodiments, operations within a transaction may include a parameter indicating that they should be performed immediately, rather than waiting for the end of the transaction. This may allow a developer to intentionally violate atomicity for a transaction, which may facilitate concurrency in some situations. For example, a developer may use an immediate operation to ensure that data is not stale when a user has multiple browser windows open. It may also allow, for example, a developer to use data from a cache GET in the same transaction.

For an immediate put operation, the value may be directly committed to cache data structure 430 prior to the end of transaction 410. For an immediate get operation, the value may be pulled directly rom cache data structure 430 using the associated key. Direct operations may or may not change the data stored in local buffer 420.

Exemplary Cache Hierarchy and Partitions

Figure 5A:
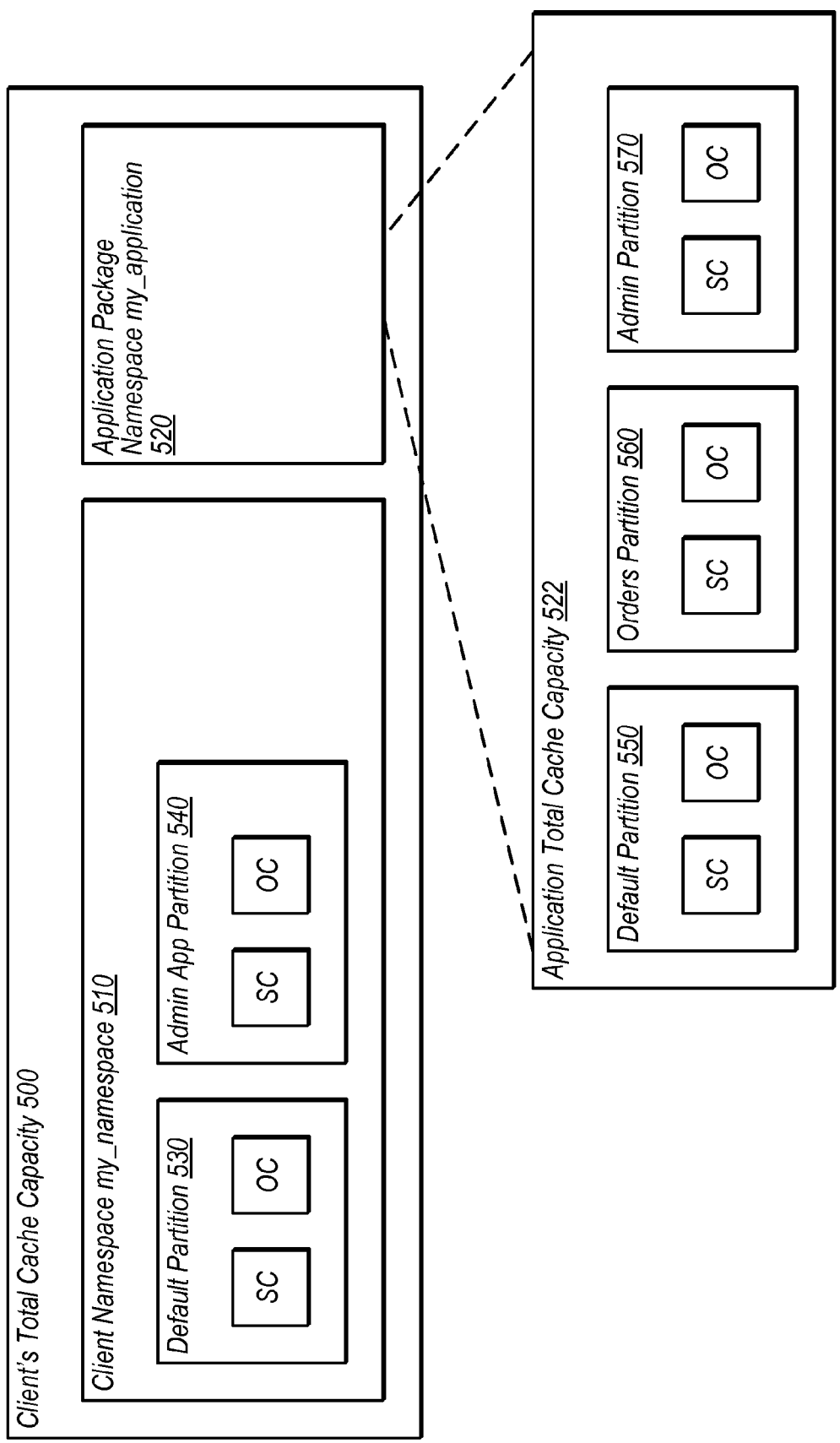
FIG. 5A is a block diagram illustrating an exemplary cache hierarchy for maintaining separate namespaces and partitions, according to some embodiments.
Figure 5B:
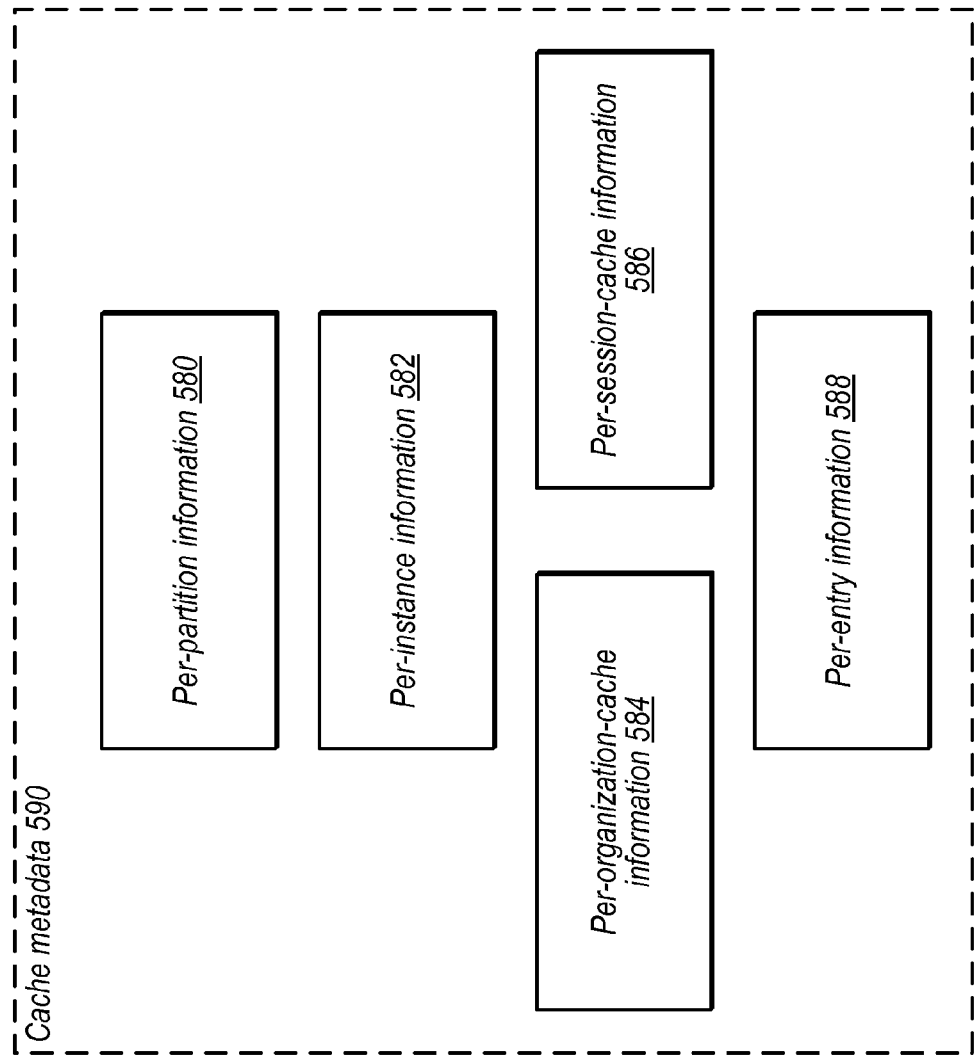
FIG. 5B is a diagram illustrating exemplary types of metadata associated with the cache.

FIG. 5A illustrates an exemplary cache hierarchy. In the illustrated embodiment, a client tenant is provided with a total cache capacity 500. (Note that similar principles apply in non-multi-tenant systems.) The client may then subdivide the capacity for various namespaces/partitions/types of cache, etc., and separate capacities may be maintained for the different portions, in some embodiments. In the illustrated embodiment, the cache for the client includes a namespace my_namespace 510 and a namespace my_application 520. The my_application namespace 520 may be a separate namespace dedicated to a particular application package, e.g., which may be purchased from among multiple application packages available to the client tenant.

In some embodiments, cached data for a particular tenant is not available to cached data for other tenants, even though the data may be stored in the same data structure on the same hardware. Similarly, in some embodiments, data stored in one namespace of a given tenant is not available to other namespaces of the tenant. Thus, in the illustrated embodiment, cached data for my_application 520 may not be visible to applications using the my_namespace 510 namespace. If a client wishes for cached data to be available to multiple different applications by default, it may assign those applications to the same namespace. Further, the client may specify visibility parameters for cached data, e.g., to indicate that cached data should be available across multiple (or all) namespaces for the client.

Client namespace my_namespace 510, in the illustrated embodiment, includes a default partition 530 and an administration application partition 540. In some embodiments, separate cache partitions are assigned separate capacities. For example, default partition 530 may be assigned a 5 GB capacity and admin application partition 540 a 10 GB capacity. When a given partition is at, near, or over capacity, system 16 may evict cached data. Assigning applications or data to particular partitions may allow flexibility in separately managing capacities for different types of data. In the illustrated embodiment, each partition includes a session cache (SC) and an organization cache (OC). The session cache may be used to cache data for individual user sessions (and data stored in a session cache may be private to that session). The organization cache may be used to cache data for a partition that is relevant to multiple user sessions, in some embodiments.

An administrator for a given client may control where the client's overall cache capacity is allocated dynamically, e.g., by changing the allocations for different partitions. For example, a client may service multiple groups, departments, or teams that have different applications and may assign each its own cache partition. A given cache partition may then be able to guarantee a given level of capacity for the assigned group, team, or department. Further, an administrator may be able to buy additional capacity (overall or for a given partition) if desired.

Thus, each partition may be treated separately for capacity and eviction monitoring. In some embodiments, separate statistics are maintained for each partition. Partitions may be subsets of cache namespaces and may be created, deleted, or renamed for client administrators. The total of all partitions in a given namespace may not exceed the namespace capacity, in some embodiments. Various information may be maintained for each partition, including without limitation: name, namespace, version, cache type, builder class, creator, date/time of creation, date/time of last modification, identify of last modifier, initial capacity, current capacity, etc. In some embodiments validation may ensure that a partition needed for a particular application package is included with that package.

Application package namespace my_application 520, in the illustrated embodiment, includes separate partitions 550, 560, and 570 for default, orders, and administration. The orders partition 560, in the illustrated embodiment, may be used to cache data associated with orders placed using the application package. In the illustrated embodiment, each partition includes a respective session cache portion and organization cache portion, which may be treated as individual caches in some embodiments. The illustrated hierarchal cache organization techniques may allow flexibility in assigning data limits, data access authorizations, etc.

Software Vendors and Cache

In some embodiments, independent software vendors (ISVs) may develop applications and sell them to multiple different customers or users. These vendors may be referred to as "providers" of a given application while the purchasing clients may be referred to as "subscribers" in the context of the application. In some embodiments, if such an application uses cache 118, the ISV purchases cache space for each subscriber application install. The subscribers may then allocate the capacity among different partitions for the installed application and/or purchase additional capacity if desired, in some embodiments.

In some embodiments, the provider process proceeds as follows. The provider evaluates where the cache would benefit their application. The provider decides what type(s) of cache to use, for what data, and how it will be partitioned. The provider also decides an initial capacity, e.g., based on customer data and usage. The provider then implements the cache, including creating partitions, allocating space, and testing the cache. The provider then deploys an application package with the cache partitions included in the package and communicates the package to customers.

In this embodiment, the customers may then install the application package, which includes installing packaged partitions. At this point, the provider may or may not have actually purchased cache allocation for the customer. In some embodiments, the customer may run the application at this point without caching features. Once the provider or subscriber orders cache capacity (e.g., the initial allocation), the caching features may be enabled for the customer. The customer may then reallocate partition capacities and/or purchase additional capacity as desired.

System 16, in some embodiments, is configured to process the order, bill the provider, and enable caching features for the application package. When capacity is added, system 16 may apply it to the default partition by default, or another partition as specified. Cache may be purchased by unit cost, e.g., per megabyte or gigabyte in some embodiments.

Overview of Cache Metadata

In various embodiments, system 16 is configured to maintain various metadata in order to provide cache 118. In the illustrated embodiment of FIG. 5B, cache metadata 590 includes per-partition information 580, per-instance information 582, per-organization-cache information 584, per-session-cache information 586, and per-entry information 588. The illustrated types of metadata are exemplary and not intended to limit the scope of the present disclosure, other types of metadata may be maintained in various embodiments in addition to and/or in place of the disclosed types. More detailed examples of these various types of metadata are discussed in further detail below with reference to FIGS. 6-7.

Per-partition information 580, in some embodiments, is separately maintained for one or more partitions (e.g., separate metadata may be maintained for the default partition 530 and admin app partition 540 of FIG. 5A). This information may include organization cache keys in the partition, session caches in the partition, session cache keys in the partition, memory usage for entries in the partition, etc. This information may allow system 16 to enforce capacity limits on each partition, in some embodiments.

Per-instance information 582, in some embodiments, is separately maintained for one or more of the application servers 100. For example, this information may include memory usage by different partitions at a given application server. As another example, this information may indicate the last time a partition was accessed via the application server.

Per-organization-cache information 584, in some embodiments, is separately maintained for one or more organization caches. This information may include a list of entries in the organization cache (e.g., based on corresponding keys), TTL information for the organization cache as a whole, LRU information for entries in the organization cache, etc.

Per-session-cache information 586, in some embodiments, is separately maintained for one or more session caches. This may include statistics information for each session cache, a list of entries in each session cache, TTL information for keys in the session cache, memory usage for entries in the session cache, etc.

Per-entry information 588, in some embodiments, is separately maintained for one or more entries in organization and/or session caches. This may include values for an entry, one or more builder patterns for the entry, statistics information regarding the entry, visibility information for the entry, TTL information for the entry, etc.

In various embodiments, this information may facilitate various functionality for cache 118, as discussed in further detail below.

Exemplary Organization Cache Model

FIG. 6 shows exemplary data structures for organization cache metadata, according to some embodiments. In some embodiments, these data structures are hashes, sorted sets, lists, etc., as appropriate. In the illustrated embodiment, the information includes a data structure 610 (e.g., a hash) for a cache key key1, least-recently-used (LRU) information 620 for keys in my_partition, a list 630 of metadata associated with key1, memory usage information 640 for keys in my_partition, memory usage information 650 for different partitions on an instance, information 660 indicating whether certain partitions are active on an instance, a list 670 of keys in my_partition, and a list of time-to-live (TTL) values for keys in my_partition. Note that the exemplary illustrated types of information data structures (e.g., hashes, lists, sets, etc.) are included for exemplary purposes but are not intended to limit the scope of the present disclosure. In other embodiments, any of various metadata and/or data structures may be implemented, as appropriate.

The following naming convention is used for organization cache keys in the illustrated embodiment: <prefix>: <namespace>:<partition>:<cache-type>:<key-name>. The <prefix> may identify a relevant system, e.g., using an IP address and/or other information and may identify the tenant. The <namespace> and <partition> respectively identify the relevant namespace and partition that include the key (a default partition may be used if a partition is not specified). The <cache-type> indicates, in the illustrated embodiment, whether the cache is an organization cache or a session cache. In other embodiments, additional types of caches may be supported. The <key-name> identifies the relevant key and may be a unique value, for a given tenant. The naming convention may facilitate enforcement of privacy settings, e.g., preventing tenant's data from being available to other tenants, enforcing visibility scopes to particular namespace(s), etc.

Data structure 610, in the illustrated embodiment, is configured to store the actual value for a cache entry in the value field. In the illustrated embodiment, data structure 610 includes multiple key/value pairs including the value, a pointer to builder code, lastaccess, stats field, evict, and visibility. The value associated with each key, in the illustrated embodiment, may be stored as a byte array or another format. Each field may be accessed using the key. For example, the datetime value may be retrieved by specifying the key1.lastaccess key. In some embodiments, a byte array may be generated by serializing a class in an object-oriented programming language such as Apex or Java. In other embodiments, the values in hash 610 may encode objects directly.

The builder field may point to a builder pattern that is invoked to generate data for the value field in certain situations, in some embodiments. This functionality is described in further detail below.

The lastaccess field indicates a date and time of the last access of key1, in the illustrated embodiment.

The stats field, in the illustrated embodiment, is a byte array that may indicate various stats related to key1. This may include put information (e.g., operation times, serialization times, initiator, etc.), get information (e.g., hits, misses, operation times, de-serialization times, access counts, last initiator, etc.), etc. In some embodiments, system 16 is configured to aggregate this information across all application server instances to provide overall statistics for cache 118. In some embodiments, statistics may be maintained top-to-bottom (e.g., in the context of FIG. 5A) and may include, without limitation, per-namespace, per-partition, and per-cache: capacity, hits, misses, largest cached items, most accessed active cached items, least accessed active cached items, etc.

The evict value, in the illustrated embodiment, indicates that key1 should not be evicted. In some embodiments, this value may be set to true to indicate that key1 is a candidate for eviction. Generally, these illustrated values are examples of metadata that may be maintained for a given cache entry. In other embodiments, any of various appropriate metadata may be maintained for each entry of a given type.

The visibility field, in some embodiments, indicates the scope of visibility for key1. In the illustrated embodiment, key1 is visible only in the my_namespace namespace. In various embodiments, when putting data into an organization cache, an application can indicate whether the data should be shared or private, or otherwise indicate the scope of the data. In some embodiments, a visibility value may be binary, e.g., to indicate whether the key is visible only within its associated namespace or is visible to all namespaces for a given tenant. In other embodiments, the visibility value may set out a list of namespaces for which the key is visible. In other embodiments, any of various appropriate encodings for a visibility parameter may be utilized.

As discussed above, in some embodiments, when a web application requests data from an entry in cache 118 via an application server 100 (e.g., using a get command), the application server is configured to determine whether the data is still cached, using a key such as key1. If the data is available in cache 118 (which may be determined based on whether list 670 includes the key), then the application server may provide the data from cache 118. In some embodiments, user programs may be configured to re-generate data if it is not available in cache 118.

Data structure 620, in the illustrated embodiment, is a sorted set of all organization cache keys in my_partition (key1 and key2 in the illustrated example) and least-recently-used (LRU) information for each key. In the illustrated embodiment, the score value associated with each key indicates an amount of time since the key was used. This information may be used in determining what data to evict from cache 118, in some embodiments, e.g., when my_partition is above its assigned capacity. For example, in response to determining that a given partition is at a particular percentage of its allocated capacity (e.g., 80%, 99%, 120%, etc.), system 16 may begin evicting data in the partition. The decision of what data to evict may be based on LRU data in set 620, TTL data, the size of data in an entry, etc.

Data structure 630, in the illustrated embodiment, is a list of metadata added to my_partition for key1. In the illustrated example, this includes the entries for key1 in data structures 620, 640, 670, and 680. List 630 may facilitate deleting information associated with a key when it is removed from cache 118, in some embodiments.

Data structure 640, in the illustrated embodiment, maintains information that indicates the amount of memory used for each organization cache key in my_partition, in the illustrated embodiment. This information may be used, e.g., in conjunction with the LRU information in data structure 620, to determine what data to evict, in some embodiments. This data may also be used, in the aggregate, to determine the amount of data stored in a given partition at a given time.

Data structures 650 and 660, in the illustrated embodiment, are maintained at each application server instance (e.g., each Redis instance on an application server 100 in embodiments in which a Redis database is used for cache 118). Thus, each application server 100 may maintain a version of information 650 and 660 corresponding to its respective portion of cache 118. Data structure 650, in the illustrated embodiment, is a hash that indicates the total memory usage for at least the portion of each partition associated with the instance. Data structure 660, in the illustrated embodiment, is a sorted set that indicates the last time a particular partition was accessed on the instance. In the illustrated embodiment, information 650 and 660 is for organization caches, but similar information may be used for session caches as well, in various embodiments. In some embodiments, system 16 may perform cache maintenance operations (e.g., periodic checking of current data usage) only on partitions that are active within a recent time interval. In some embodiments, decisions on whether to evict data from a particular partition may be made based on data structures 650 and 660.

Data structure 670, in the illustrated embodiment, stores time-to-live values for organization cache keys in my_partition. In some embodiments, keys may be automatically evicted after their TTL has expired. In other embodiments, keys may be maintained even after their TTL has expired, but may be considered first as candidates for eviction if the data usage for my_partition is above some threshold usage. In some embodiments, an organization cache as a whole may have a TTL value (not shown).

The illustrated exemplary metadata may be used to manage an organization cache, in various embodiments, including facilitating caching operations, statistics, eviction, privacy partitioning, etc. In some embodiments, the illustrated metadata is stored in a shared data structure for multiple tenants. For example, various instances hashes or sets shown in FIG. 6 may be used to store data for different tenants. In other embodiments, separate data structures may be maintained in the same memory space for different tenants. In various embodiments, data associated with one tenant is not visible to other tenants in the multi-tenant system.

Exemplary Session Cache Model

FIG. 7 shows exemplary data structures for session cache metadata, according to some embodiments. In the illustrated embodiment, the information includes a information 710 for a session corresponding to a session identifier (sid) sid1, a set 720 of LRU information for keys associated with sid1, information 730 indicating metadata associated with sid1, information 740 indicating memory use information for keys associated with sid1, a list 770 of partitions used during the session, a list 780 of session identifiers in the relevant partition and instance, and a list 790 of TTL values for metadata. The following naming convention is used for session cache keys in the illustrated embodiment: <prefix>:<namespace>:<partition>:<cache-type>:<session-id>:<key>.

Data structure 710, in the illustrated embodiment, includes fields for session cache entries with keys KeyA and KeyB which are each paired with a byte-array of serialized data. In some embodiments, each user session is associated with such a data structure. In the illustrated embodiment, hash 710 also includes statistics information and a visibility parameter. In some embodiments, the visibility parameter is a binary value, indicating shared or not shared. In the illustrated embodiment, the visibility value indicates that sid1 data is visible within the my_namespace namespace. As discussed above with reference to OC visibility parameters, any of various encodings may be used to specify visibility. Note that a given session may access multiple namespaces (e.g., if a user accesses multiple different applications within different namespaces during the same session). Thus, depending on visibility parameters, cached data for the session may be available across these namespaces or restricted to its associated namespace.

Data structure 720, in the illustrated embodiment, is a set of LRU values for all session cache (SC) keys in my_partition (KeyA and KeyB in the illustrated example). This information may be used in determining what data to evict from cache 118, in some embodiments, e.g., when my_partition is above a threshold related to its assigned capacity.

Data structure 730, in the illustrated embodiment, is a list of metadata associated with sid1. In the illustrated example, this includes the entries for sid1 in set 720 and list 790. List 730 may facilitate deleting information associated with a session when it ended or otherwise evicted from cache 118, in some embodiments.

Data structure 740, in the illustrated embodiment, is a hash that maintains the amount of memory used for metadata associated with sid1, in the illustrated embodiment. This information may be used, e.g., in conjunction with the LRU information in set 720, to determine what data to evict. In some embodiments, LRU is applied across all sessions for a given tenant when determining which session cache to evict from.

Data structure 770, in the illustrated embodiment, is a list of all partitions used during a particular session. This may be used to clean-up the session when the session ends or for earlier eviction.

Data structure 780, in the illustrated embodiment, is a list of customer-provided time-to-live values for SC keys in my_partition for a particular application server. In some embodiments, keys may be automatically evicted after their TTL has expired. In other embodiments, keys may be maintained even after their TTL has expired, but may be considered first as candidates for eviction if the data usage for my_partition is above some threshold usage.

The illustrated information may be used to manage a session cache, in various embodiments, including facilitating caching operations, statistics, eviction, privacy partitioning, etc.

Exemplary Eviction to Remain within Capacity

Consider, for example, a situation in which the orders partition 560 reaches a threshold value relative to its allotted capacity. For example, the allotted capacity may be 4 GB, and the organization cache in the partition may store 2 GB of data and the session cache may store 0.5 GB of data each for four different user sessions. In this situation, the threshold value may be 100%, but any of various thresholds may be used in other embodiments. In response to detecting the threshold (e.g., based on periodic analysis, in some embodiments) system 16 may use various input data to determine what entries to evict from cached entries in orders partition 560. In some embodiments, system 16 is configured to use hash 640 and/or list 670 to determine the data usage for a given partition. This input data may include, without limitation: LRU data in sets 620 and 720, TTL information in 680 and 790, and memory usage information in 640 and 740. In some embodiments, some input data may trump other types (e.g., entries that have expired based on their TTL may be evicted first) while in other embodiments the input data may be weighted according to any of various algorithms.

Once entries have been selected for eviction, system 16 is configured to determine all cached data associated with an entry in order to remove it. For example, if system 16 determines that the entry corresponding to key1 is to be evicted, it may use information 630 to determine the various information maintained for key1 and subsequently delete or invalidate that information (e.g., by deleting hash 610 and list 630, and removing information for key1 from 620, 640, 670, and 680).

Exemplary API Functions

FIG. 8 illustrates exemplary put and get functions for an organization cache. Other functions (not shown) may include without limitation: remove, contains, getName, getKeys, clear, getCapacityUsed, etc. For example, a "remove" function may remove all cached data associated with a provided key. A "contains" function may indicate whether a particular key is present in the cache. A "getName" function may be used to get the name of a partition associated with a particular key, if the namespace is partitioned. A "getKeys" function may be used to get a list of all keys in a particular namespace, partition, and/or cache. A "clear" function may delete all keys in a particular partition, while a "getCapacityUsed" function may return the current used capacity as a portion of the partition's maximum capacity. In other embodiments, any of various appropriate commands may be implemented in addition to and/or in place of those discussed herein.

The put function, in the illustrated embodiment, takes key, value, builder instance, TTL, visibility, and immutable parameters. The key, as discussed above, may be a unique key associated with the stored value. The value may be an object, but may be serialized before storage (e.g., written as a byte array). Builder patterns are discussed in further detail below, and may be used to generate the value for a key in some situations. The TTL parameter may provide a time to live for the cached data. The visibility parameter may indicate the privacy scope for the cached data. The immutable parameter may indicate whether the value is allowed to be overwritten outside of the put namespace. This parameter may be stored with an entry (not explicitly shown in FIG. 6) and may allow broad read visibility a cache entry with more limited write visibility. In some embodiments, various put parameters are cached using a hash such as hash 610 in cache 118.

The first get function, in the illustrated embodiment, takes a key parameter and returns a cached data object from an entry corresponding to the key. In some embodiments, system 16 is configured to check visibility parameters and is configured to provide data in response to a get command only if the appropriate tenant and namespace is being used.

The second get function, in the illustrated embodiment, is used to obtain a list of multiple objects based on their associated key parameters.

FIG. 9 illustrates exemplary put, get, and remove functions for a session cache. In some embodiments, a session cache API may also support any of various functions, e.g., as discussed above with reference to FIG. 8.

The put function, in the illustrated embodiment, takes key, value, immutable, global, and ttl parameters and caches the value using the key. The immutable and ttl features may be used as discussed above with reference to FIG. 8. The global value, in some embodiments, indicates whether the cached value is visible to other namespaces. This may be a boolean value. In other embodiments, visibility may be represented using other values, e.g., that list one or more namespaces that are allowed to access the object. The global value in FIG. 9 may be specified differently than the visibility value of FIG. 8 because different APIs are used for these functions, in some embodiments, and/or the underlying data structure may be implemented differently.

The get function, in the illustrated embodiment, takes key and immediate parameters and returns an object associated with the key. The immediate parameter is used in some embodiments to indicate that the get should be performed right away rather than at the end of an atomic transaction. This may facilitate concurrency (e.g., via multiple browser windows) and avoid stale cached data, in some embodiments.

The remove function, in the illustrated embodiment, takes a key and immediate parameter and gets and removes corresponding cached data.

In other embodiments, any of various APIs may be used to provide access to session and/or organization caches. The illustrated API functions are included for illustrative purposes but are not intended to limit the scope of the present disclosure.

Exemplary Builder Patterns

In some embodiments, in addition to (or instead of) specifying a value for cached data, a PUT may specify a builder pattern. In FIG. 6, for example, this is shown as a pointer to a byte array in hash 610. In some embodiments, the byte array may be fetched and de-serialized to produce executable program code that specifies operations to generate the value for a provided key.

In some embodiments, when a GET is performed using a key that has a null value field (e.g., in hash 610), system 16 instead retrieves and de-serializes the builder field to generate program code, which it then executes. The builder pattern may access a database, perform computations on user input data, etc. If there are any exceptions in the builder patterns, they may be signaled to a requesting application and handled gracefully. System 16 may store the result of the builder code in the cache in the "value" field and also return the result to the GET caller. In some embodiments, system 16 is then configured to re-serialize the builder pattern and store it in the builder field. In some embodiments, this may also allow modification of the builder pattern by the requesting application, if desired.

The "value" field may be null for various reasons. For example, an eviction algorithm may be configured to retain keys that have non-null builder fields but delete the data corresponding to their "value" fields. In this case, the builder pattern may be used to ensure that there is never a miss for the particular key in the cache (barring an exception, for example), because it can generate a value for the key if needed. In some embodiments, a PUT operation may simply provide a null "value" parameter intentionally, in order to load a builder pattern for future use on the first GET that uses the key. Further, in some embodiments, a builder pattern result value may be provided in response to a request but may not be cached, based on configuration parameters or request parameters. This may allow a developer to store the builder pattern for a future use without using cache storage for the data in the short-term.

In other embodiments, a builder pattern may be invoked even when corresponding data is present and valid. For example, in these embodiments a parameter may be stored with a cache entry indicating that the builder pattern should be invoked upon a request to access the entry. For example, this may be used by a developer to indicate that a cached entry should be updated in the future, without having to update the data in the short-term.

Exemplary Methods

Figure 10:
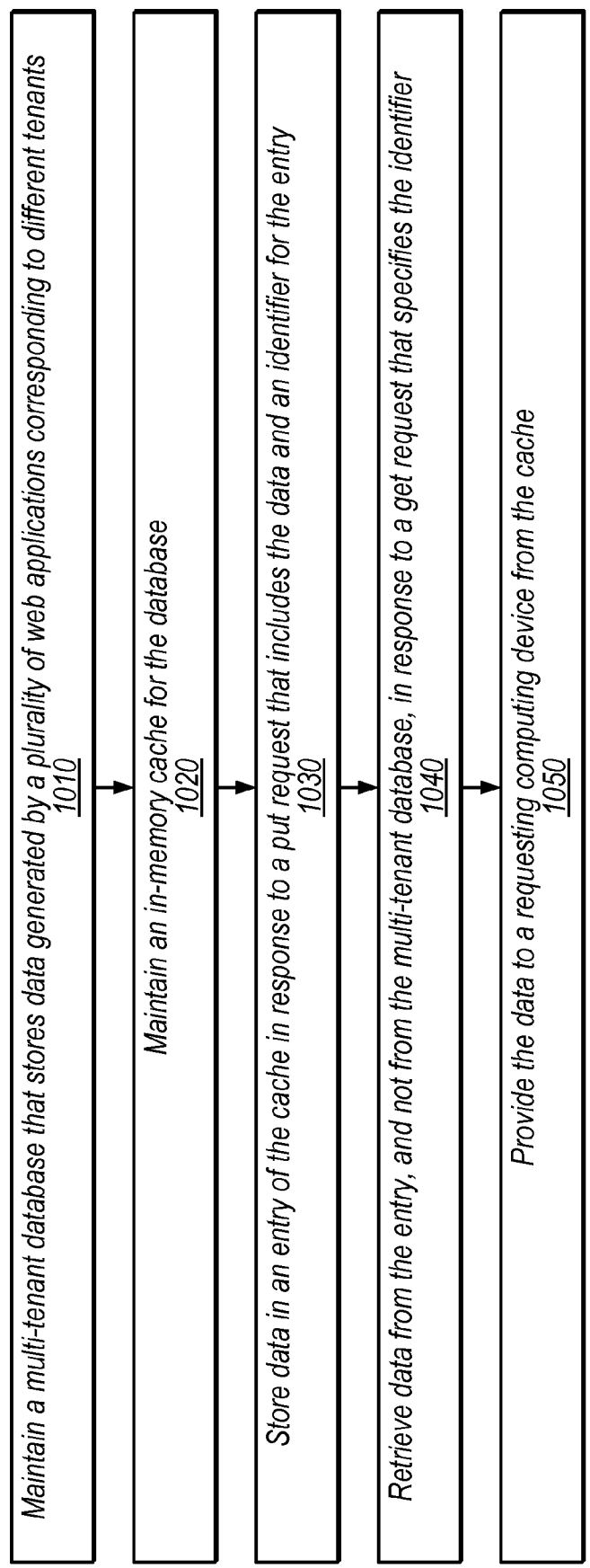
FIG. 10 is a flow diagram illustrating a method for operating a cache, according to some embodiments.

Turning now to FIG. 10, a flow diagram illustrating a method for operating an in-memory cache is shown, according to some embodiments. The method shown in FIG. 10 may be used in conjunction with any of the computer systems, devices, elements, or components disclosed herein, among other devices. In various embodiments, some of the method elements shown may be performed concurrently, in a different order than shown, or may be omitted. Additional method elements may also be performed as desired. Flow begins at 1010.

At 1010, in the illustrated embodiment, system 16 maintains a multi-tenant database (e.g., database 108) that stores data generated by a plurality of web application corresponding to different tenants.

At 1020, in the illustrated embodiment, system 16 maintains an in-memory cache for the database. In various embodiments, the multi-tenant database may not be stored in the system memory space of application servers 100, but may be stored in longer term storage (e.g., non-volatile storage rather than volatile storage) and may be stored using paging, as is well-understood in the art. In contrast, in various embodiments the in-memory cache is stored in system memory space of application servers 100. This may improve performance of the in-memory cache relative to database 108.

At 1030, in the illustrated embodiment, system 16 stores data in an entry of the cache in response to a put request that includes the data and an identifier for the entry (e.g., a key). In some embodiments, system 16 may also allocate or update memory blocks for storing various metadata for the entry, e.g., as shown in FIGS. 6 and/or 7.

At 1040, in the illustrated embodiment, system 16 retrieves data from the entry in response to a get request that specifies the identifier. In some embodiments, if the cache does not have data for the entry, system 16 may respond with an indication of a cache miss. In some embodiments, system 16 may invoke a builder pattern in such a situation. In situations where the cache has data for the entry, performance may be improved relative to retrieving the data from a database or performing operations to generate the data.

At 1050, in the illustrated embodiment, system 16 provides the data to a requesting computing device from the cache and not from the multi-tenant database.

Figure 11:
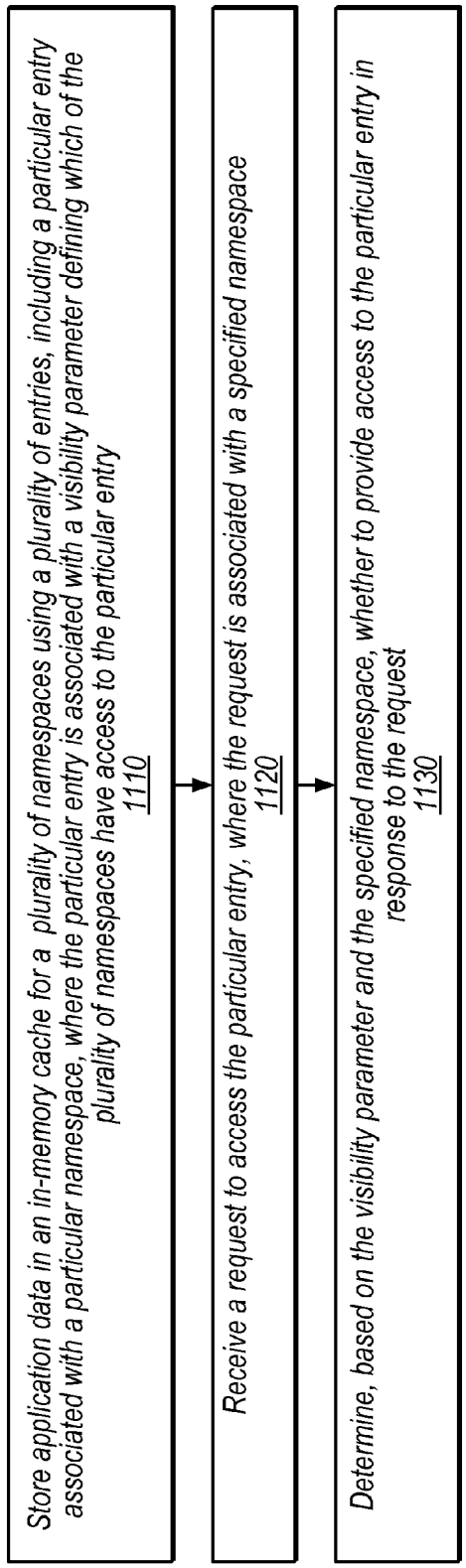
FIG. 11 is a flow diagram illustrating a method for using a visibility parameter, according to some embodiments.

Turning now to FIG. 11, a flow diagram illustrating a method for enforcing visibility parameters is shown, according to some embodiments. The method shown in FIG. 11 may be used in conjunction with any of the computer systems, devices, elements, or components disclosed herein, among other devices. In various embodiments, some of the method elements shown may be performed concurrently, in a different order than shown, or may be omitted. Additional method elements may also be performed as desired. Flow begins at 1110.

At 1110, in the illustrated embodiment, system 16 stores application data in an in-memory cache for a plurality of namespaces using a plurality of entries. In the illustrated embodiment, this includes a particular entry associated with a particular namespace, and the entry is associated with a visibility parameter that defines which of the plurality of namespaces have access to the particular entry. As used herein, the term "entry" refers to data at a granularity at which the in-memory cache is configured to receive data for caching or provide cached data. For example, in the context of FIG. 6, an entry may refer to the value field in hash 610 and the various metadata associated with key1. Thus, the term entry does not connote a specific set of hardware (e.g., memory locations) used to store an entry, as the set of hardware may change (e.g., based on a change in the size of cached data for a particular entry). This is in contrast to caches such as an L1 cache in a central processing unit (CPU), for example, which are not software managed. Thus, different entries in cache 118 may have different sizes, attributes, parameters, etc. In some embodiments, each entry for a given tenant is associated with a unique key. In other embodiments, any of various techniques may be used to specify entries in cache 118.

In some embodiments, the visibility parameter is stored in the entry, e.g., as shown in the examples of FIGS. 6-7. In other embodiments, the visibility parameter may be stored separately and associated with the entry. The visibility parameter may be binary or may contain more detailed information encoding a set of namespaces that are allowed to access the particular entry. The visibility parameter may be updated for a given cache entry to change the scope of visibility.

At 1120, in the illustrated embodiment, system 16 receives a request to access the particular entry. In the illustrated embodiment, the request is associated with a specified namespace. The request may be received based on program code executed on system 16 (e.g., on an application server 100) or based on program code executed on a client device. In other words, the received request may be generated on the computing device that receives the request, in some embodiments. The visibility parameter may have been specified by a request to cache the data prior to the request of FIG. 11.

At 1130, in the illustrated embodiment, system 16 determines, based on the visibility parameter and the specified namespace, whether to provide access to the particular entry in response to the request. For example, if the visibility parameter is binary and indicates restriction to a single namespace, system 16 may determine whether the particular namespace and the specified namespace match. In other embodiments, system 16 may determine whether the specified namespace is one of a set of namespaces that are allowed to access the entry based on the visibility parameter. In some embodiments, the visibility parameter may include information that specifies a different visibility scope for write access than for read accesses.

The illustrated techniques may increase performance by caching application data while allowing configurable privacy for cached data within a given tenant.

Figure 12:
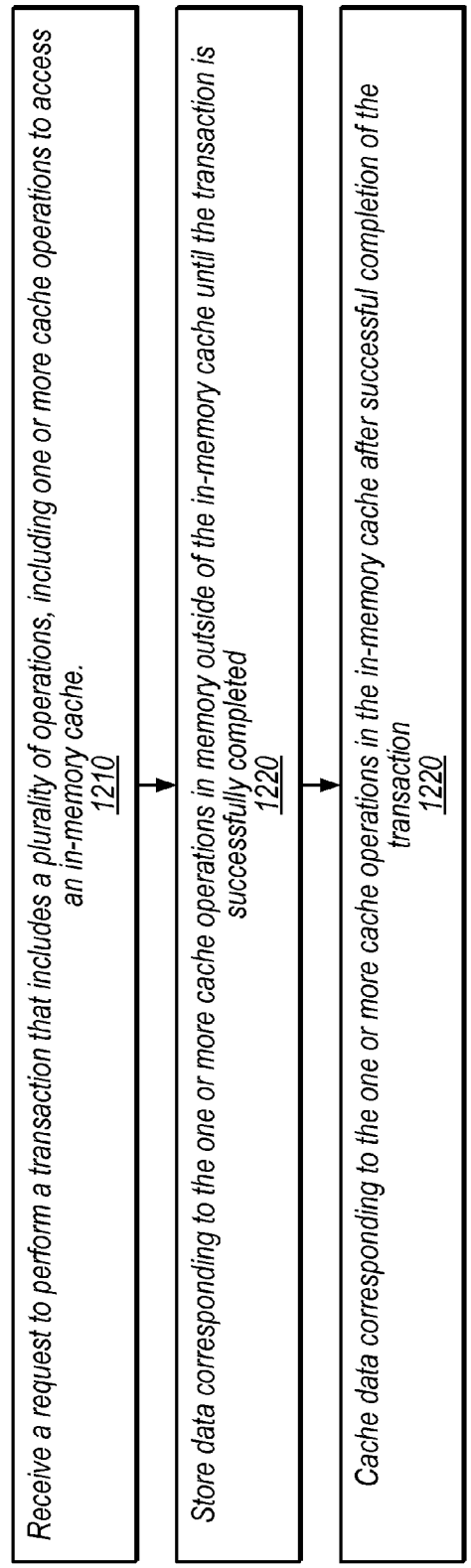
FIG. 12 is a flow diagram illustrating a method for buffering cache data, according to some embodiments.

Turning now to FIG. 12, a flow diagram illustrating a method for performing transaction that include caching operations, according to some embodiments. The method shown in FIG. 12 may be used in conjunction with any of the computer systems, devices, elements, or components disclosed herein, among other devices. In various embodiments, some of the method elements shown may be performed concurrently, in a different order than shown, or may be omitted. Additional method elements may also be performed as desired. Flow begins at 1210.

At 1210, in the illustrated embodiment, an application server 100 receives a transaction that includes a plurality of operations, including one or more cache operations to access an in-memory cache. The transaction may be an Apex or HTTP request, for example. The cache operations may be gets and/or puts, for example, as shown in FIG. 4.

At 1220, in the illustrated embodiment, the application server 100 stores data corresponding to the one or more cache operations in memory outside of the in-memory cache (e.g., in a local buffer 420 memory area as shown in FIG. 4) until the transaction is successfully completed. This may (1) increase performance by maintaining nearby if it is used again (e.g., because cached data may be sharded to other application servers) and/or (2) allow for atomic execution of transactions, in some embodiments. In some embodiments, the data stored in 1220 is maintained in the same memory as cached data, but in a different area of memory and/or using a different data structure.

At 1230, in the illustrated embodiment, the application server 100 caches data corresponding to the one or more cache operations in the in-memory cache after successful completion of the transaction. In some embodiments, the application server 100 is configured to stored the deltas of put operations (e.g., cache a final value for a given cache entry but not cache one or more intermediate values for the entry) one the transaction is completed successfully.

In some embodiments, an application server 100 may perform a cache operations immediately, instead of waiting until the end of a transaction, based on a parameter. For example, an application server 100 may get cached data or put data into cache 118 before the end of a transaction in response to an immediate parameter. This may prevent atomic execution but may facilitate concurrency, in some embodiments. Such a parameter may be used to get cached data in a single transaction and use the data in the same transaction. If the data is not available in cache 118, a requesting application may receive an exception and handle the exception by fetching the data from database 108 instead.

Figure 13:
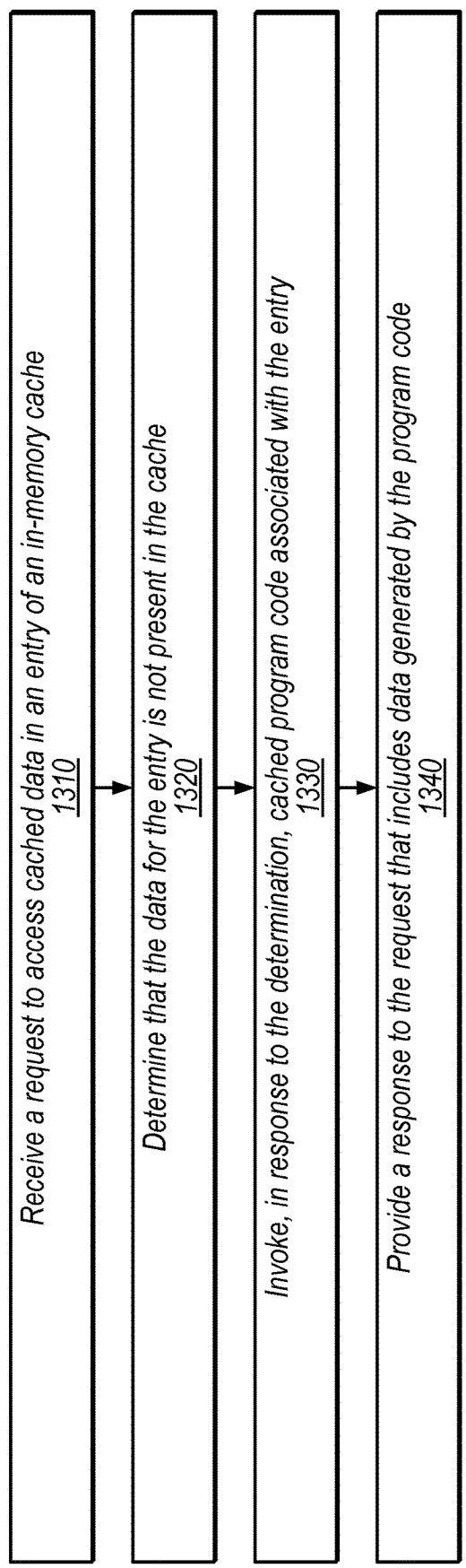
FIG. 13 is a flow diagram illustrating a method for using a builder pattern, according to some embodiments.

Turning now to FIG. 13, a flow diagram illustrating a method using a builder pattern, according to some embodiments. The method shown in FIG. 13 may be used in conjunction with any of the computer systems, devices, elements, or components disclosed herein, among other devices. In various embodiments, some of the method elements shown may be performed concurrently, in a different order than shown, or may be omitted. Additional method elements may also be performed as desired. Flow begins at 1310.

At 1310, in the illustrated embodiment, system 16 receives a request to access cached data in an entry of an in-memory cache. The request may be a get operation, for example.

At 1320, in the illustrated embodiment, system 16 determines that the data for the entry is not present in the cache. The data may have been evicted or the entry may have been allocated without data, for example.

At 1330, in the illustrated embodiment, system 16 invokes cached program code associated with the entry in response to the determination. This may include retrieving the program code from the cache, de-serializing the program code, and executing the program code. The program code may operate on user input data, query a database, etc. to generate data for the entry.

At 1340, in the illustrated embodiment, system 16 provides a response to the request that includes data generated by the program code. In some embodiments, system 16 is configured to never return a miss for entries that include a valid builder pattern, because the builder pattern may be invoked to generate data for such entries. The program code may be modified and/or stored in the cache after invocation. In some embodiments, a client device is configured to execute program instructions to cause the program code to be cached for the entry. This may allow developers to incorporate builder patterns into their web applications.

Various operations described herein may be implemented by a computing device configured to execute program instructions that specify the operations. Similarly, various operations may be performed by circuitry desired or configured to perform the operations. In some embodiments, a non-transitory computer-readable medium has program instructions stored thereon that are capable of causing various operations described herein. As used herein, the term "processing element" refers to various elements or combinations of elements configured to execute program instructions. Processing elements include, for example, circuits such as an ASIC (Application Specific Integrated Circuit), portions or circuits of individual processor cores, entire processor cores, individual processors, programmable hardware devices such as a field programmable gate array (FPGA), and/or larger portions of systems that include multiple processors, as well as any combinations thereof.

This specification includes references to "one embodiment," "some embodiments," or "an embodiment." The appearances of these phrases do not necessarily refer to the same embodiment. Particular features, structures, or characteristics may be combined in any suitable manner consistent with this disclosure.

Various units, circuits, or other components may be described or claimed as "configured to" perform a task or tasks. In such contexts, "configured to" is used to connote structure by indicating that the units/circuits/components include structure (e.g., circuitry) that performs the task or tasks during operation. As such, the unit/circuit/component can be said to be configured to perform the task even when the specified unit/circuit/component is not currently operational (e.g., is not on). The units/circuits/components used with the "configured to" language include hardware—for example, circuits, memory storing program instructions executable to implement the operation, etc. Reciting that a unit/circuit/component is "configured to" perform one or more tasks is expressly intended not to invoke 35 U.S.C. §112(f) for that unit/circuit/component.

Although specific embodiments have been described above, these embodiments are not intended to limit the scope of the present disclosure, even where only a single embodiment is described with respect to a particular feature. Examples of features provided in the disclosure are intended to be illustrative rather than restrictive unless stated otherwise. The above description is intended to cover such alternatives, modifications, and equivalents as would be apparent to a person skilled in the art having the benefit of this disclosure.

The scope of the present disclosure includes any feature or combination of features disclosed herein (either explicitly or implicitly), or any generalization thereof, whether or not it mitigates any or all of the problems addressed herein. Accordingly, new claims may be formulated during prosecution of this application (or an application claiming priority thereto) to any such combination of features. In particular, with reference to the appended claims, features from dependent claims may be combined with those of the independent claims and features from respective independent claims may be combined in any appropriate manner and not merely in the specific combinations enumerated in the appended claims.

What is claimed is:

1. A method, comprising:
    an application server receiving a request to perform a transaction that includes a plurality of operations, including one or more cache operations to access an in-memory cache; and
    the application server performing the transaction, including:
        storing data corresponding to the one or more cache operations in memory outside of the in-memory cache until the transaction is successfully completed; and
        caching data corresponding to the one or more cache operations in the in-memory cache after successful completion of the transaction.

2. The method of claim 1, wherein the in-memory cache is distributed across a plurality of application servers.

3. The method of claim 1, wherein the caching includes storing a final value of data based on multiple operations to a particular cache entry and does not include caching one or more intermediate values for the particular cache entry.

4. The method of claim 1, further comprising:
using the data stored outside of the in-memory cache by a first one of the plurality of operations as input for a second one of the plurality of operations.

5. The method of claim 1, wherein the stored data is not serialized, the method further comprising serializing at least a portion of the stored data before the caching.

6. The method of claim 1, wherein the transaction is performed atomically.

7. The method of claim 1, further comprising:
in response to a parameter in at least one of the one or more cache operations, performing the at least one of the one or more cache operations prior to successful completion of the transaction.

8. The method of claim 1, further comprising:
maintaining a database of web application data, wherein at least a portion of the database of web application data is not stored in a system memory space, wherein the in-memory cache is separate from the database of web application data.

9. A system, comprising:
one or more processors; and
one or more memories having program instructions stored thereon that are capable of being executed by the one or more processors to cause operations comprising:
receiving a transaction that includes a plurality of operations, including one or more cache operations to access an in-memory cache; and
performing the transaction, including:
storing data corresponding to the one or more cache operations in memory outside of the in-memory cache until the transaction is successfully completed; and
caching data corresponding to the one or more cache operations in the in-memory cache after successful completion of the transaction.

10. The system of claim 9, wherein the system includes a plurality of application servers and the caching includes storing data on multiples ones of the plurality of application servers.

11. The system of claim 9, wherein the caching includes storing a final value of data based on multiple operations to a particular cache entry and does not include caching one or more intermediate values for the particular cache entry.

12. The system of claim 9, wherein the operations further comprise using the data stored outside of the in-memory cache based on a first one of the plurality of operations as input for a second one of the plurality of operations.

13. The system of claim 9, wherein the transaction is performed atomically.

14. The system of claim 9, wherein the operations further comprise:
in response to an immediate parameter in at least one of the one or more cache operations, performing the at least one of the one or more cache operations by accessing the in-memory cache prior to successful completion of the transaction.

15. A non-transitory computer-readable medium having computer instructions stored thereon that are capable of causing operations comprising:
receiving a transaction that includes a plurality of operations, including one or more cache operations to access an in-memory cache; and
performing the transaction, including:
storing data corresponding to the one or more cache operations in memory outside of the in-memory cache until the transaction is successfully completed; and
caching data corresponding to the one or more cache operations in the in-memory cache after successful completion of the transaction.

16. The non-transitory computer-readable medium of claim 15, wherein the in-memory cache is distributed across a plurality of application servers.

17. The non-transitory computer-readable medium of claim 15, wherein the caching includes storing a final value of data based on multiple operations to a particular cache entry and does not include caching one or more intermediate values for the particular cache entry.

18. The non-transitory computer-readable medium of claim 15, wherein the operations further comprise:
using the data stored outside of the in-memory cache by a first one of the plurality of operations as input for a second one of the plurality of operations.

19. The non-transitory computer-readable medium of claim 15, wherein the transaction is performed atomically.

20. The non-transitory computer-readable medium of claim 15, wherein the operations further comprise:
in response to a parameter in at least one of the one or more cache operations, performing the at least one of the one or more cache operations by accessing the in-memory cache prior to successful completion of the transaction.

* * * * *